(12) United States Patent
Tomisawa

(10) Patent No.: US 7,319,436 B2
(45) Date of Patent: Jan. 15, 2008

(54) APPARATUS AND METHOD FOR DISPLAYING THREE-DIMENSIONAL IMAGE

(75) Inventor: Isao Tomisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 730 days.

(21) Appl. No.: 10/763,256

(22) Filed: Jan. 26, 2004

(65) Prior Publication Data

US 2004/0150585 A1 Aug. 5, 2004

(30) Foreign Application Priority Data

Jan. 24, 2003 (JP) .......................... P2003-016241

(51) Int. Cl.
*G09G 5/00* (2006.01)

(52) U.S. Cl. .......................................... 345/6

(58) Field of Classification Search ............... 345/4–6, 345/1.1–6; 348/40–52
See application file for complete search history.

(56) References Cited

U.S. PATENT DOCUMENTS

| | | | |
|---|---|---|---|
| 4,649,425 A | 3/1987 | Pund | |
| 6,005,608 A * | 12/1999 | Chakrabarti | 348/46 |
| 6,054,969 A | 4/2000 | Haisma | |
| 6,281,895 B1 * | 8/2001 | Jeong | 715/810 |
| 6,646,623 B1 * | 11/2003 | Chakrabarti | 345/6 |
| 6,661,425 B1 * | 12/2003 | Hiroaki | 345/629 |
| 7,148,859 B2 * | 12/2006 | Suyama et al. | 345/6 |
| 7,215,302 B2 * | 5/2007 | Satoh et al. | 345/7 |
| 2002/0041266 A1 | 4/2002 | Koyama et al. | |
| 2002/0075208 A1 | 6/2002 | Bae et al | |
| 2002/0105516 A1 | 8/2002 | Tracy | |
| 2003/0071765 A1 * | 4/2003 | Suyama et al | 345/6 |
| 2004/0008156 A1 * | 1/2004 | Kuroda et al. | 345/6 |

FOREIGN PATENT DOCUMENTS

| | | |
|---|---|---|
| EP | 0 959 377 A2 | 11/1999 |
| EP | 1 209 508 A2 | 5/2002 |
| EP | 1 361 760 A2 | 11/2003 |
| JP | 2000-115812 A | 4/2000 |
| WO | WO 01/56265 A2 | 8/2001 |

* cited by examiner

*Primary Examiner*—Sumati Lefkowitz
*Assistant Examiner*—Rodney Amadiz
(74) *Attorney, Agent, or Firm*—Sughrue Mion, Pllc.

(57) ABSTRACT

An apparatus for displaying a three-dimensional image of an object to be displayed, through a superimposing of a plurality of images of the object, which are placed so as to be apart from each other on a line of sight of an observer, comprises a plurality of display units and a display image control unit. The display units are disposed in tandem on the line of sight. Each of the display units comprises at least one screen section for displaying at least one image of the images. The display image control unit displays a screen section-adjustment image on each of the display units, to enable the three-dimensional image to be displayed, in case where the observer is placed in a predetermined observation position.

20 Claims, 7 Drawing Sheets

APPARATUS AND METHOD FOR DISPLAYING THREE-DIMENSIONAL IMAGE

BACKGROUND OF THE INVENTION

1. Field of the Invention

The present invention relates to an image display apparatus, which is provided with a plurality of display units disposed in tandem on a line of sight of an observer and controls images displayed on the respective display units so as to provide the observer with a three-dimensional image, as well as an image displaying method.

2. Description of the Related Art

As conventional apparatuses capable of displaying images three-dimensionally, various types of such apparatuses are proposed or commercialized. For example, as an electrically rewritable apparatus capable of displaying images three-dimensionally, a liquid crystal shutter-glasses system, etc., is well known. This liquid crystal shutter-glasses system takes pictures of a three-dimensional object using a camera from different directions, combines image data including parallax information obtained into one image signal, inputs the signal into a two-dimensional display apparatus and displays it. An observer wears liquid crystal shutter-glasses, which, for example, allow light to pass through the right eye-liquid crystal shutter and cause the left eye-liquid crystal shutter to shield light for odd fields. On the other hand, the liquid crystal shutter-glasses allow light to pass through the left eye-liquid crystal shutter and cause the right eye-liquid crystal shutter to shield light for even fields. At this time, an image for the right eye is displayed in odd fields in synchronization with an image for the left eye in even fields so that the observer watches the images including parallax between the right eye and left eye through the respective eyes, and thereby obtains a three-dimensional image.

Furthermore, there is a display apparatus, which includes a plurality of two-dimensional display apparatuses that are disposed in tandem in a direction of the line of sight of the observer, allows the observer to watch those images displayed overlapped and thereby recognize the overlapped image as a three-dimensional image though those images are discrete images in the depth direction. On the other hand, there is a display apparatus, which provides variations for brightness of images displayed on two-dimensional display apparatuses to eliminate the situation of those discrete images so that the observer feels as if the object exists at a midpoint of discrete positions and has more naturally a feeling in three dimensions. For example, there is a proposal of a brightness modulation type three-dimensional display system which displays images of an object from a plurality of display apparatuses overlapped with one another using a plurality of half-mirrors and allows a semi-transparent object to be displayed or allows an object behind to be seen through, as described for example in Japanese Laid-Open Patent Application No. 2000-115812.

Such a display apparatus, which is provided with the plurality of display units disposed in tandem on a line of sight of an observer, has a predetermined viewing position at which the observer is provided visually with the three-dimensional image. The above-mentioned viewing position is specific to the display apparatus. No presence of observer in the predetermined viewing position makes it difficult or impossible to provide visually the observer with a three-dimensional image, thus involving technical problems.

In addition, even when an observer views images displayed on the display units in the predetermined viewing position, the observer's visual function, which differs on an individual basis, may make it difficult or impossible to provide visually the observer with a three-dimensional image, thus involving technical problems.

SUMMARY OF THE INVENTION

An object of the present invention, which was made in view of the above-described problems, is therefore to provide a display apparatus and method, which makes it possible to provide visually an observer with a three-dimensional image, even when, for example, the observer is not located in the predetermined viewing position or the observer's visual function differs on an individual basis.

In order to attain the aforementioned object, an apparatus according to one aspect of the present invention for displaying a three-dimensional image of an object to be displayed, through a superimposing of a plurality of images of said object, which are placed so as to be apart from each other on a line of sight of an observer, comprises: a plurality of display units disposed in tandem on said line of sight, each of said plurality of display units comprising at least one screen section for displaying at least one image of said plurality of images; and a display image control unit for displaying a screen section-adjustment image on each of said plurality of display units, to enable the three-dimensional image to be displayed, in case where the observer is placed in a predetermined observation position.

In order to attain the aforementioned object, a method according to another aspect of the present invention for displaying a three-dimensional image of an object to be displayed, through a superimposing of a plurality of images of said object, which are placed so as to be apart from each other on a line of sight of an observer, said method comprises:

an image signal generation step for generating a screen section-adjustment image, which enables the three-dimensional image to be displayed on each of said plurality of display units, in case where the observer is placed in a predetermined observation position; and a display image control step for displaying said screen section-adjustment image, which has been generated by said image signal generation step, on said each of said plurality of display units.

The operations and other advantages of the present invention will become more apparent from the embodiments described below.

DETAILED DESCRIPTION OF THE PREFERRED EMBODIMENTS

Embodiments of the present invention will be described below.

An apparatus according to the embodiment of the present invention, for displaying a three-dimensional image of an object to be displayed, through a superimposing of a plurality of images of the object, which are placed so as to be apart from each other on a line of sight of an observer, comprises: a plurality of display units disposed in tandem on the line of sight, each of the plurality of display units comprising at least one screen section for displaying at least one image of the plurality of images; and a display image control unit for displaying a screen section-adjustment image on each of the plurality of display units, to enable the three-dimensional image to be displayed, in case where the observer is placed in a predetermined observation position.

According to the embodiment of the display apparatus of the present invention, the display apparatus is operated to cause the plurality of display units, which are disposed in tandem on a line of sight of an observer, to superimpose the plurality of images, thus making it possible to provide the observer with the three-dimensional image. Accordingly, the observer can recognize visually the thee-dimensional image. In the present invention, the phrase "superimposing of a plurality of images of the object, which are placed so as to be apart from each other on a line of sight of an observer" means not only a state in which the images are fully superimposed without no deviation, but also another state in which the images are superimposed with a predetermined amount of deviation so as to enable the observer to recognize visually the three-dimensional image. The phrase "plurality of images of an object to be displayed" means not only a plurality of images of a single object to be displayed, but also a plurality of images of different objects to be displayed, in an example case where images of a road to be superimposed are combined with images of an arrow indicating a traveling direction in an display apparatus of a car navigation system. The term "screen section" means an area, which occupies a part or entirety of a screen of the display unit to display for example a predetermined image. In this case, the term "screen" of the display unit means the maximum area in which the screen section(s) can exists, for example, the whole display screen on which an observer can normally recognize visually the image. Each of the display units (i.e., the whole display screen) may have a single screen section or a plurality of screen sections.

According to a brightness modulation-type three-dimensional display system, for example, there can be provided a continuous three-dimensional display in which allocation of brightness of images of the same object, which are to be displayed on the respective two display units, causes an observer to recognize visually one of the images behind the other thereof. Alternatively, there can be provided a discrete three-dimensional display system in which image sections are displayed discretely on any one of the two display units. There can also be provided a continuous or discrete three-dimensional display in which an observer recognizes visually the image as if it exists in one of three or more display units.

Especially, in the present embodiment of the present invention, the display image control unit causes a screen section-adjustment image to be displayed on each of the display units. Such a display of the screen section-adjustment image is carried out, for example, when an observer, who bought the display apparatus, sits on a couch to take his/her viewing or audiovisual position at his/her home, just before the observer enjoys the contents of the images, which are actually displayed three-dimensionally, at his/her viewing or audiovisual position, or when the observer changes his/her posture or position to make a change in at his/her viewing or audiovisual position during visual recognition of the images. Alternatively, the above-mentioned display of the screen section-adjustment image may be carried out for example by means of factory hands in a factory of the display apparatus when making a manufacturing inspection of the display apparatus, or a person in distributors, retailing stores or dealers.

The screen section-adjustment image is displayed on each of the plurality of display units so as to enable an observer, who takes his/her predetermined viewing position, to recognize visually the screen section-adjustment images in an appropriately superimposed state on the line of sight of the observer. In an example case, the screen section-adjustment images are images, which have the same shape and are to be displayed on the respective display units. Adjusting a size and display position of the image on a side of the observer causes the images to be displayed in a superimposed state on the line of sight of the observer, who takes his/her predetermined viewing position. Displaying the predetermined images for three-dimensional display on the respective display units enables the observer, who takes his/her viewing position at which he or she can recognize visually the screen section-adjustment images in the superimposed state on his/her line of sight, to recognize visually them in the form of three-dimensional image.

When the observer views the screen section-adjustment images displayed on the display apparatus of the embodiment of the present invention, but cannot recognize visually them in the superimposed state on his/her line of sight, he/she makes adjustment of his/her initial viewing position to move it to an appropriate viewing position at which these images can be recognized visually in the superimposed state on his/her line of sight. Movement of the observer to the appropriate viewing position makes it possible for him/her to recognize visually the three-dimensional image of the predetermined object to be displayed. Displaying the screen section-adjustment images in this manner makes it possible to provide easily the observer with the appropriate viewing position at which the three-dimensional image can be recognized visually, thus providing advantageous effects.

In this case, it may be configured that information, which is indicative of the appropriate viewing position at which the three-dimensional image can be recognized visually, is displayed on the display apparatus. For example, a message of "Please take your position "certain" meters away from the apparatus to view the contents" may be outputted in the form of image or voice as a recommended precise or general viewing position. It relieves need for an observer to locate an appropriate viewing position at random to move, thus making it possible for the observer to take easily his/her appropriate viewing position to recognize visually the three-dimensional image. Alternatively, there may be adopted a configuration that there are displayed the screen section-adjustment images according to precise or general information on the actual position of the observer (for example, a distance between the screen and the observer), which have previously been inputted through an external input, for example by an operation utilizing a remote controller, and then, the observer can move slightly in accordance with the displayed screen section-adjustment images to make a fine adjustment of his/her viewing position. In either case, shifting the observer's position with a general or precise adjustment through a visual sense of the observer who has actually viewed the screen section-adjustment images makes it possible to determine a preferable positional relationship between the display apparatus and the observer, thus recognizing visually the three-dimensional image in an appropriate manner.

In case where the display apparatus is provided with a display mode control unit for making a change in a display mode for the screen section-adjustment images as displayed, as described later, the change in the display mode for the screen section-adjustment images as displayed makes it possible to achieve, in a relatively easy manner, a situation of enabling an observer to recognize visually the screen section-adjustment images in a superimposing state on his/her line of sight, namely, a situation in which the three-dimensional image can be recognized visually. Alternatively, changing the display mode in accordance with instructions given by an observer, for example through a remote controller, enables the observer to recognize visually the more appropriate three-dimensional image according to his/her visual sense.

According to the display apparatus according to the embodiment of the present invention, an observer can shift his/her position, while viewing the screen section-adjustment images, thus enabling him/her to recognize visually the three-dimensional image in a relatively easy manner. Alternatively, the display mode for the screen section-adjustment image are changed by the observer, thus making it possible to achieve in a relatively easy manner the display apparatus for enabling the observer to recognize visually the three-dimensional image.

In the embodiment of the present invention, there may be adopted any other suitable three-dimensional display system than the brightness modulation type thee-dimensional display system, thus providing the same technical effects as described above.

In one of modes of the embodiment of the display apparatus according to the present invention, the apparatus further comprises: a display mode control unit for making a change in a display mode for the screen section-adjustment image, which is displayed on at least one display unit of the plurality of display units; and an input unit for enabling instructions on change in the display mode to be inputted into the display mode control unit.

In this mode, the display mode control unit, which includes for example a microcomputer, is configured so as to enable the display mode for the image, which is viewed by an observer, to be changed. Here, the term "display mode" means a display mode for the image, which is viewed by an observer. In case where a certain image is displayed on the display unit, moving the display unit away from the observer causes him/her to recognize that the image is reduced. The display mode for such an image is changed in this manner. In addition, change in brightness, chromaticity, and relationship between the images in size or position leads to change in the display mode for the image.

In addition, the input unit enables instructions that the display mode is to be changed automatically or by an observer's instructions to be inputted. Instructions given to the input unit therefore makes it possible to change the display mode for the image displayed on at least one or desired display unit.

Therefore, changing the display mode for the screen section-adjustment images by the display mode control unit on the basis of the instructions given to the input unit makes it possible to achieve, in a relatively easy manner, a situation of enabling an observer to recognize visually the screen section-adjustment images in a superimposing state on his/her line of sight. More specifically, there can be achieved in a relatively easy manner the display apparatus, which enables the observer to recognize visually the desired three-dimensional image.

This makes it possible for the observer to recognize visually the three-dimensional image at the desired viewing position, without shifting his/her position. The more appropriate three-dimensional image can also be recognized visually according to the observer's visual sense.

The input unit may be configured so that instructions can automatically be inputted for example by means of a microcomputer provided in the display apparatus. Alternatively, it may be configures so that an observer's desired instructions can be inputted for example by means of a remote controller as described later.

In another mode of the display apparatus provided with the input unit as described above, the input unit may comprise an external input device thorough which an external input operation is to be carried out.

According to such a mode, the external input device enables the observer's desired instructions to be inputted into the display mode control unit. More specifically, it is possible to input instructions that the display mode for the screen section-adjustment image displayed on at least one of the display units is to be changed, through the observer's operation.

The display mode control unit changes the display mode for the screen section-adjustment image displayed on the predetermined display unit, based on the instructions through the external input device.

Accordingly, an observer can input the instructions that the display mode for the desired screen section-adjustment image is to be changed, through the external input device, while viewing the image for the screen section-adjustment image displayed on the display unit. As a result, it is possible to provide in a relatively easy manner the observer with a situation of enabling him/her to recognize visually the screen section-adjustment images in an appropriately superimposing state on his/her line of sight. More specifically, there can be achieved in a relatively easy manner the display apparatus, which enables the observer to recognize visually the desired three-dimensional image.

The instructions that the display mode is to be changed may instructions that a position of at least one display unit is to be changed, a position or size of the screen section is to be changed, or brightness, distortion, chromaticity or inclination angle of the screen section (or the screen) is to be changed.

There may be used, as the external input device, any kind of device including a pointing device such as a mouse, a fixed controller, a remote controller, a crisscross key, buttons and a voice input device. There may also be used a touch screen, which is disposed on the front side of the display apparatus so as to carry out an input operation.

In another mode of the display apparatus provided with the input unit as described above, there may be adopted a configuration in which the display mode control unit is configured to enable at least one display unit to shift in a predetermined direction; and the input unit enables instructions to shift the at least one display unit in the predetermined direction by a predetermined distance to be inputted into the input unit.

According such a mode, the display mode control unit is configured so as to enable at least one of the display units to move to a desired position in any direction, namely, forward (i.e., in an approaching direction to an observer), backward (i.e., in a direction away from the observer), up and down, and from side to side, and then to be held stationarily in the above-mentioned desired position. More specifically, there is adopted a configuration that at least one of the display units can be moved along the direction of the observer's line of sight or in a perpendicular direction thereto for example by an operation of an electrical or mechanical power source (or a driving power generated by such an operation) or by a manual operation. As a result, the image displayed on the above-mentioned at least one of the display units can be moved along the direction of the observer's line of sight or in a perpendicular direction thereto. In addition, there is adopted a configuration that the above-mentioned at least one of the display units can be held stationarily in the desired position for example by halting the operation of the electrical or mechanical power source or providing a stopper.

The display mode control unit may be operated based on the instructions inputted through the input device. The instructions to be inputted by means of the input device may be for example instructions to move a predetermined display unit in a predetermined direction by a predetermined amount of movement. The instructions are not limited only to them as described above, but they may alternatively merely be instructions on any mode of movement of at least one display unit.

In an example case, the display mode control unit moves physically at least one display unit forward or backward on the basis of the instructions given by the input device. The forward movement of the display unit causes an observer to recognize as if the image displayed on the display unit has been enlarged. Alternatively, the backward movement of the display unit causes the observer to recognize as if the image displayed on the display unit has been reduced. In another example case, moving the display unit in any direction, for example, up and down, or from side to side on a plane perpendicular to the observer's line of sight causes the observer to recognize that the position of the image displayed on the display unit has changed. It is therefore possible to change the display mode for the image displayed on the display unit, in a relatively easy manner.

The electrical power source described above may for example include a motor or an electromagnetic actuator. The mechanical power source described above may for example include a hydraulic system.

In addition, there may be adopted a configuration that at least one of the display units can be moved to a desired position by a manual operation with the assistance of an external force caused by the observer's sliding operation of the display unit in any direction for example, up and down, or from side to side.

In the embodiment of the display apparatus provided with the input device as described above, the display mode control unit may be configured to enable an apparent distance between the adjacent two display units of the plurality of display units. Accordingly, the input unit may be configured to enable instructions to vary the above-mentioned apparent distance to a predetermined distance to be inputted into the input unit.

Such a configuration can provide the same effects as in the case where the display unit is moved forward or backward in the direction of the observer's line of sight, without actually moving the display unit. It is therefore possible to change the display mode for the image displayed on the display unit, in a relatively easy manner.

In an example case of the display unit in which a variable-focal-length lens is provided between the adjacent two display units, changing the focal length of the variable-focal-length lens by means of the display mode control unit on the basis of the instructions given by the input device makes it possible to change relatively easily the apparent distance between the adjacent two display units in an optical aspect or the observer's actual viewing.

In such a case, the position of the display unit, which is disposed behind the variable-focal-length lens, of the two adjacent display units, is changed in the observer's actual viewing. It is therefore possible to provide the same effects as in the case where the display unit is moved forward or backward in the direction of the observer's line of sight, without actually moving the display unit.

A liquid crystal lens may for example be used as the variable-focal-length lens. The liquid crystal lens permits its focal length to be changed in accordance with applied voltage, thus making it possible to change the apparent distance between the adjacent two display units in a relatively easy manner. In this case, the display mode control unit may be suitably configured so as to control the applied voltage to achieve the desired focal length (i.e., the apparent distance between the adjacent two display units).

The instructions given by means of the input device may be the distance between the adjacent two display units. In this case, the display mode control unit is configured so as to be capable of calculate the focal length in accordance with the input value of the distance between the adjacent two display units. Alternatively, the focal length may directly be inputted. A value of voltage to be applied to the liquid crystal lens may be inputted.

In the embodiment of the display apparatus provided with the input device as described above, the display mode control unit may be configured to enable the screen section of the at least one display unit to shift on a plane, which intersects said line of sight. Accordingly, the input unit may be configured so as to enable instructions to shift the at least one screen section by a predetermined distance to be inputted into the input unit.

Such a configuration can provide the same effects as in the above-described embodiment where the at least one display unit is moved in the predetermined direction. More specifically, the instructions to move at least one screen section in the predetermined direction by the predetermined amount of movement are inputted into the display mode control unit by the input device. The display mode control unit controls for example image signals supplied to the least one display unit so as to change the position of the at least one screen section on the screen of the display unit.

This causes the observer to recognize that the position of the image displayed on the display unit has changed. It is therefore possible to change the display mode for the image displayed on the display unit, in a relatively easy manner.

In the embodiment of the display apparatus provided with the input device as described above, the display mode control unit may be configured to enable the screen section of the display unit to be scaled. Accordingly, the input unit may be configured so as to enable instructions to scale the screen section of the display unit at a predetermined magnification to be inputted into the input unit.

Such a configuration can provide the same effects as in the above-described embodiment where the at least one display unit is moved forward or backward in the direction of the observer's line of sight. More specifically, the instructions to scale the at least one screen section of the display unit at the predetermined magnification are inputted into the display mode control unit by the input device. The display mode control unit controls for example image signals supplied to the least one display unit so as to scale the at least one screen section of the display unit.

This causes the observer to recognize that the size of the image displayed on the display unit has changed. It is therefore possible to change the display mode for the image displayed on the display unit, in a relatively easy manner.

In the above-described embodiments in which the position of the screen section is moved or the screen section is scaled, there may be adopted a configuration in which the display mode is changed in image displayed on the screen section. More specifically, the display position may be moved in image or the screen section may be scaled in image.

In the embodiment of the display apparatus provided with the input device as described above, the display mode control unit may be configured to enable brightness of at least one part of the screen section of the display unit to vary. Accordingly, the input unit may be configured so as to enable instructions to vary the brightness of the at least one part to be inputted into the input unit.

Such a configuration can achieve a state in which the screen sections of the display units are identical in brightness to each other. The instructions given by the input device can achieve a state in which the observer's desired brightness is maintained. Therefore, displaying the images for the three-dimensional display on the display apparatus having the adjusted brightness enables the observer to recognize visually the three-dimensional image in an appropriate manner.

In the brightness modulation type display apparatus, uniformity of brightness of the screen sections enables the observer to recognize visually the images for the three-dimensional display, which have been subjected to a suitable brightness adjustment, in a superimposed state. As a result, the observer obtains the great advantage that he/she can recognize visually the three-dimensional image in a more appropriate manner.

The instructions given by the input device may be instructions indicative of the absolute magnitude of brightness. In case where the observer inputs his/her instructions, the instructions maybe instructions indicative of increase or decrease in brightness.

In the embodiment of the display apparatus provided with the input device as described above, the display mode control unit may be configured to enable chromaticity of at least one part of the at least one screen section to vary. Accordingly, the input unit may be configured so as to enable instructions to vary the chromaticity of the at least one part to be inputted into the input unit.

Such a configuration enables the state of color, which the observer recognizes visually, on the screen sections of each of the display units.

In an example case where the image with the color of red enhanced is desired, the instructions are accordingly inputted into the display mode control unit by the input device. The display mode control unit can rewrite for example the image signals to enhance the color of red by a predetermined degree on the screen section. Such an adjustment is not limited only to the color of red, but can be made in a desired color in depth.

In addition, there can also be provided a state in which the observer can recognize visually the color state on each of the screen sections to be identical to each other.

In the embodiment of the display apparatus provided with the input device as described above, the display mode control unit may be configured to enable distortion of at least one part of the at least one screen section to vary. Accordingly, the input unit may be configured so as to enable instructions to vary the distortion of the at least one part to be inputted into the input unit.

Such a configuration can provide adjustment in distortion of each of the screen sections of the display units. Strain may be caused on a part of the screen section, due to characteristic properties of the display device such as a CRT (cathode ray tube). Occurrence of different distortion in the display units may be highly visible on the three-dimensional display, even when such distortion itself is too small to be visible. In such a case, distorting one of the screen sections in correspondence to the distortion of the other of the screen sections make is possible to achieve the three-dimensional image having uniformity as a whole or an appropriate display characteristic on the entire screen. It is also possible to change the distortion of the screen section, which is viewed by the observer, in an appropriate manner.

The instructions given by the input device may not necessarily be instructions in which a position or shape of the distortion is specified, but may be, for example, instructions to avoid the distortion. In such a case, the display mode control unit may be configured so as to calculate the distortion of the screen section based on the distortion of the screen.

In the embodiment of the display apparatus provided with the input device as described above, the display mode control unit may be configured to enable an inclination angle of at least one part of the at least one screen section to vary. Accordingly, the input unit may be configured so as to enable instructions to vary the inclination angle of the at least one part to be inputted into the input unit.

Such a configuration enables the inclination angle of the screen section, which is viewed by the observer, to be varied. It is therefore possible to incline the desired screen section, or keep the desired screen section horizontally.

In the embodiment of the display apparatus provided with the input device as described above, the display mode control unit may apply a signal processing to an image signal supplied to the at least one display unit to make a change in the display mode for the screen section-adjustment image.

According to such a configuration, the display mode control unit applies the signal processing to the image signal supplied to the screen section of the display unit, to rewrite for example a signal indicative of magnification on the screen section or display position. It is therefore possible to change, as a processing in the normal display processing step, the position of the screen section or scale the screen section in a relatively easy manner.

In addition, the image signals including substantial information on the screen section are subjected to the signal processing, thus making it possible to change, as a processing in the normal display processing step, brightness, chromaticity, distortion and inclination angle of the screen section, in a relatively easy manner.

In the embodiment of the display apparatus provided with the input device as described above, the display apparatus may further comprise a record unit for recording state information on a predetermined state of the display apparatus.

According to such an embodiment, the input device and the display mode control unit enable the state of the display apparatus, in which the display modes of the display units have been changed, to be recorded. In an example case, it is possible to record a state of the display apparatus, in which the predetermined observer can recognize visually the screen section-adjustment images in a superimposed state on his/her line of sight. The term, "predetermined state of the display apparatus" means a state of the display apparatus, which is defined by the positions of the plurality of display units, and a position and size of the screen section, as well as brightness, chromaticity, distortion and inclination angle of the screen section.

It is therefore possible for the observer to record the state of the display apparatus, which has been once adjusted, and read the recorded data again to utilize them, as described later.

Alternatively, only the state of the display apparatus, which has been subjected to a fine adjustment utilizing the external input device, is not necessarily be recorded, but there may be adopted a configuration in which a state information indicative of the predetermined state of the display apparatus can be recorded.

The record unit can record the state information on an information recording medium such as a hard disc or RAM.

In the embodiment of the display apparatus provided with the record unit as described above, the input unit may be configured so as to enable any one of the state information to be selected and enable instructions to make a change in the display mode based on the above-mentioned any one as selected to be inputted into the input unit.

Such a configuration makes it possible to duplicate the state of the display apparatus, which has already been adjusted so as to provide properly the three-dimensional image, on the basis of the state information indicative of such a state. It is therefore possible for the observer to achieve the display apparatus, which has already been kept in a state in which he/she can recognize the three-dimensional image, in a relatively easy manner. As a result, there can be duplicated the display apparatus, in which the same images can be displayed, namely, the observer can recognize visually the screen section-adjustment images in a superimposed state on his/her line of sight from a position that is placed away from the display apparatus in the predetermined direction by the predetermined distance.

In the other embodiment of the display apparatus of the present invention, there may be adopted a configuration in which, of the plurality of display units, at least one display unit other than a display unit, which is disposed on a rearmost side in a viewing direction of the observer, comprises a translucent display device.

According to such embodiment, it is possible for the observer to recognize visually the image, which is displayed on the display unit that is disposed on the rear side in the viewing direction of the observer, through the other display unit disposed on the front side in his/her viewing direction, thus permitting these display units to be disposed directly on his/her line of sight.

In the embodiment of the display apparatus provided with the translucent display device as described above, the translucent display device may comprise any one of a liquid crystal display device and an electroluminescent display device.

According to such a configuration, it is possible to display the three-dimensional image with the use of translucent panel-shaped display device such as the liquid crystal display device and the electroluminescent display device.

In the other embodiment of the display apparatus of the present invention, the plurality of display units may comprise at least one composite display unit, which is obtained thorough composition by means of a half mirror.

According to such an embodiment, the composite image can be produced through the half mirror, without disposing directly the display unit on the observer's line of sight. It is therefore possible to utilize the display unit having no light transmission property, such as a cathode-ray tube display device, a plasma display device or a field electron emission display device.

In the embodiment of the display method of the present invention, for displaying a three-dimensional image of an object to be displayed, through a superimposing of a plurality of images of said object, which are placed so as to be apart from each other on a line of sight of an observer, the method comprises: an image signal generation step for generating a screen section-adjustment image, which enables the three-dimensional image to be displayed on each of a plurality of display units, in case where the observer is placed in a predetermined observation position; and a display image control step for displaying said screen section-adjustment image, which has been generated by said image signal generation step, on said each of said plurality of display units.

According to the embodiment of the display method of the present invention, displaying the screen section-adjustment images on the plurality of display units, in the same manner as in the display apparatus of the present invention as described above, makes it possible to provide easily an observer with the appropriate viewing position at which the three-dimensional image can be recognized visually, thus providing advantageous effects. As a result, the observer can shift his/her position, while viewing the screen section-adjustment images, thus enabling him/her to recognize visually the three-dimensional image in a relatively easy manner. Alternatively, the display mode for the screen section-adjustment image are changed by the observer, thus making it possible to achieve in a relatively easy manner the display method for enabling the observer to recognize visually the three-dimensional image.

The embodiment of the display method of the present invention may be modified in accordance with the modified embodiments of the display apparatus described above of the present invention.

In the embodiment of the display method of the present invention, the method may further comprise a display mode control step for making a change in a display mode for said screen section-adjustment image, which is displayed on at least one display unit of said plurality of display units; and an input step for inputting instructions on change in said display mode.

According to such an embodiment, it is possible to change the display mode for the screen section-adjustment image, which is recognized visually by an observer, on the basis of instructions given by him/her utilizing a various kinds of input device including a pointing device such as a mouse, a fixed controller, a remote controller, a crisscross key, buttons and a voice input device, or instructions given by a microcomputer.

As a result, changing the display mode for the screen section-adjustment image on the basis of the instructions given through the input step provide an observer with a situation in which he/she can recognize visually the screen section-adjustment images in an appropriately superimposed state on his/her line of sight, in a relatively easy manner. More specifically, there can be achieved in a relatively easy manner the display method, which enables the observer to recognize visually the desired three-dimensional image.

In the embodiment of the display method of the present invention, which is provided with the input step, the method may further comprise a record step for recording state information on a predetermined state of an apparatus for displaying the three-dimensional image.

According to such an embodiment, it is possible to record the state of the display apparatus, in which the display mode of the display units has been changed. Accordingly, changing the display mode of the image displayed on the display units of which the display apparatus is composed in the display mode control step, based for example on the state information as recorded makes it possible to provide the display apparatus having the same conditions in a relatively easy manner.

According to the embodiments of the display apparatus of the present invention, the apparatus comprises the plurality of display units and the display mode control unit. According to the embodiments of the display method of the present invention, the method comprises the image signal generation step and the display image control step. As a result, an observer can shift his/her position, while viewing the screen section-adjustment images, thus enabling him/her to recognize visually the three-dimensional image in a relatively easy manner. Alternatively, the display mode for the screen section-adjustment image is changed, while an observer views the screen section-adjustment image, thus achieving the display apparatus, which enables the observer to recognize visually the three-dimensional image, in a relatively easy manner. It is therefore possible to provide visually the observer with the three-dimensional image, even when, for example, he/she is not located in the predetermined viewing position or his/her visual function differs on an individual basis. According to the embodiments of the present invention, the above-mentioned technical effect can be provided, namely, the observer can recognize visually the three-dimensional image, irrespective of differences between moving images and static images.

The operations and other advantages of the present invention will become more apparent from the following examples.

EXAMPLES

With reference now to the attached drawings, examples of the display apparatus according to the present invention will be described below.

First Example of Display Apparatus

Figure 1:
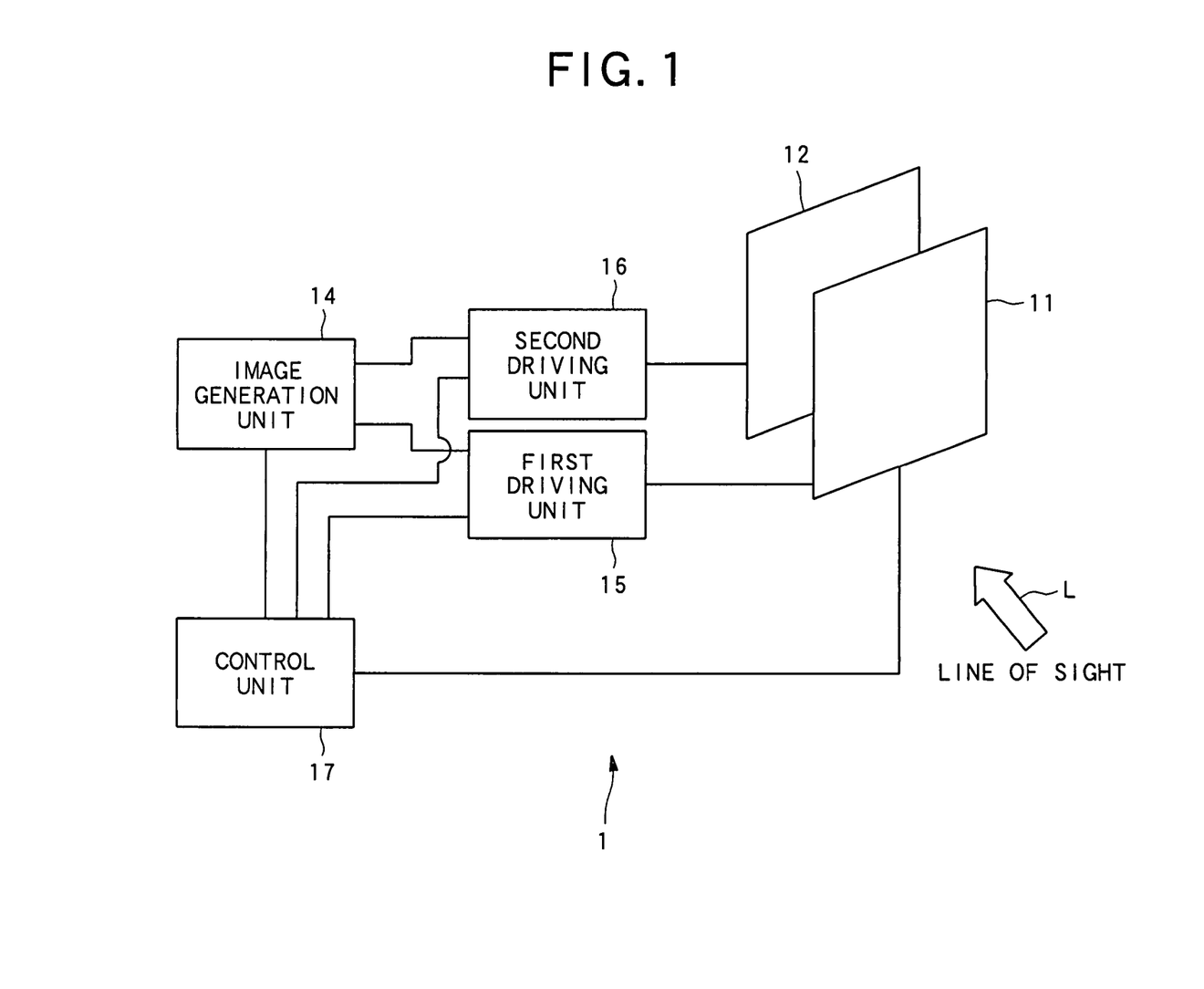
FIG. 1 is a block diagram showing a display apparatus according to the first example of the present invention.
Figure 2:
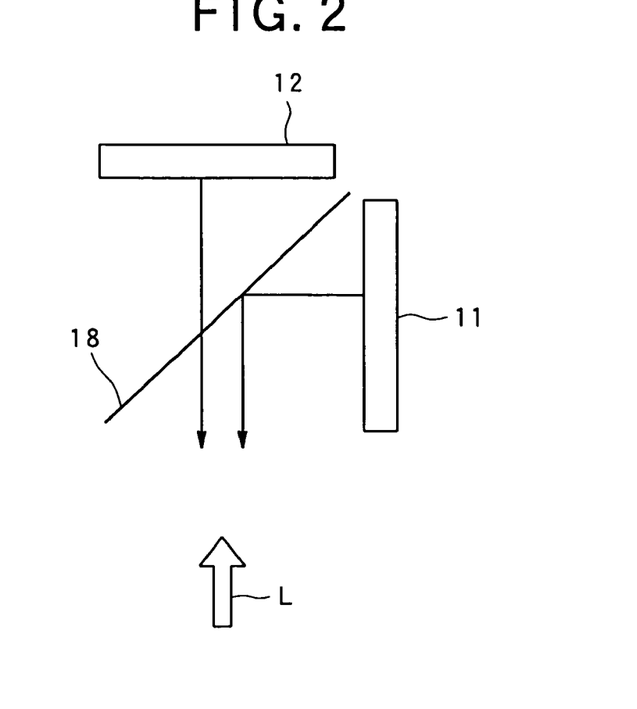
FIG. 2 is a schematic descriptive view of an optical system, illustrating another structure of a display unit of the display apparatus according to the first example the present invention.
Figure 3:
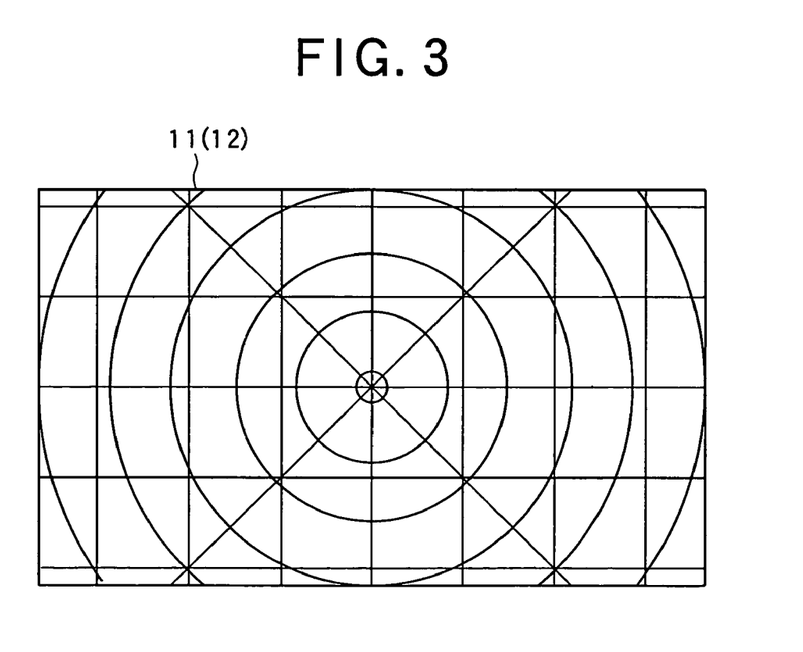
FIG. 3 is a diagrammatic view illustrating a concrete example of a screen section-adjustment image in the display apparatus according to the first example of the present invention.
Figure 4:
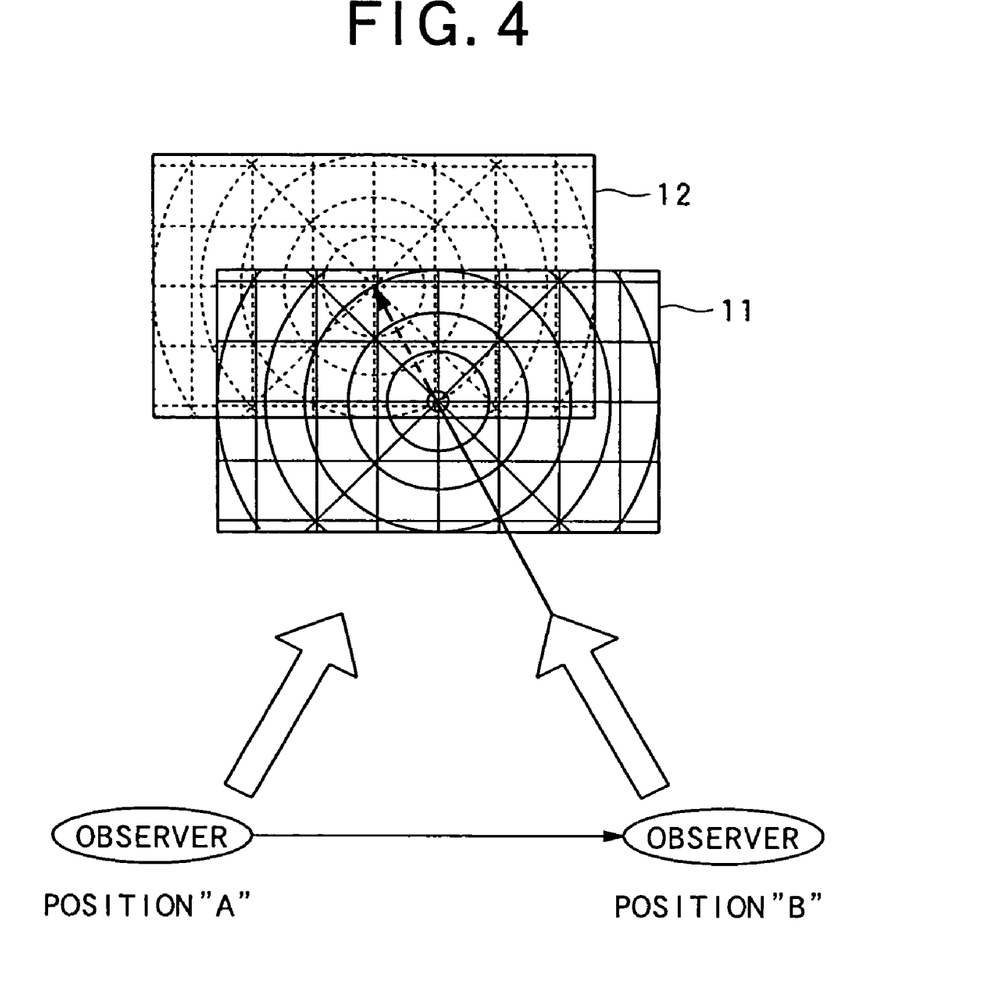
FIG. 4 is a diagrammatic view illustrating conceptually the principle of operation of the display apparatus according to the first example of the present invention.

Description will be given below of a principle of operation and a fundamental structure of the display apparatus according to the first example of the present invention with reference to FIGS. 1 to 4. FIG. 1 is a block diagram showing the display apparatus according to the first example of the present invention; FIG. 2 is a schematic descriptive view of an optical system, illustrating another structure of the display unit of the display apparatus according to the first example the present invention; FIG. 3 is a diagrammatic view illustrating a concrete example of a screen section-adjustment image in the display apparatus according to the first example of the present invention; and FIG. 4 is a diagrammatic view illustrating conceptually the principle of operation of the display apparatus according to the first example of the present invention.

The display apparatus 1 includes a front screen 11; a rear screen 12 disposed behind the front screen 11; an image generation unit 14 for generating images to be displayed on the front screen 11 and the rear screen 12; the first driving unit 15 for supplying an image signal from the image generation unit 14 to the front screen 11 to display an image thereon; the second driving unit 16 for supplying an image signal from the image generation unit 14 to the rear screen 12 to display an image thereon; and a control unit 17 for controlling entirely the display apparatus 1, as shown in FIG. 1.

The front screen 11 and the rear screen 12, which form an image display component of the display apparatus 1, are placed so as to be apart from each other by a predetermined distance on a line of sight of an observer. The front screen 11 is disposed on the front side and the rear screen 12 is disposed on the rear side. A display device having a light transmission property, such as a liquid crystal display device or an electroluminescent display device is used as the front screen 11, in order to make it possible for an observer to recognize the image displayed on the rear screen 12 through the front screen 11. On the other hand, the rear screen 12 may be such a liquid crystal display device or electroluminescent display device, or a CRT (cathode ray tube) display device, a plasma display device or a field electron emission display device, in view of the fact that the rear screen 12 is not required to be light-transmissible. In addition, the front screen 11 and the rear screen 12 are movable forward or backward on the observer's line of sight "L", and the distance between these sections 11 and 12 can be increase or decreased.

Each of the front screen 11 and the rear screen 12 has a screen section serving as an area on which an image is to be displayed. Displaying the images on the respective screen sections enables the observer to recognize visually a three-dimensional image, although discrete. Alternatively, adjusting brightness of the images causes the three-dimensional image to be displayed so as to enable the observer to recognize visually as if the three-dimensional image is located between the front screen 11 and the rear screen 12. Accordingly, a brightness modulation type three-dimensional display is also available.

The screen sections of the front and rear screens 11 and 12 occupy at least part of the respective front and rear screens 11 and 12 as regions on which the image for the three-dimensional display is to be displayed. Alternatively, the screen sections of the front and rear screens 11 and 12 may occupy the entirety of the respective front and rear screens 11 and 12. Each of the front and rear screens 11 and 12 has the single screen section, but may have a plurality of screen sections.

Alternatively, there may be adopted a configuration that a liquid crystal display device or electroluminescent display device, which has no light transmission property, is used, in place of the liquid crystal display device or electroluminescent display device, as the front screen 11. More specifically, it is possible to incorporate the display device having no light transmission property into the image screen by disposing the front screen 11 so as not to obstruct the observer's line of sight "L" relative to the rear screen 12, providing a half mirror 18 on the observer's line of sight "L" and setting an angle of the half mirror 18 so that the image displayed on the front screen 11 is superimposed on the image displayed on the rear screen 12, as shown in FIG. 2.

Returning to FIG. 1, the image generation unit 14 generates the image to be displayed on the front screen 11 and the rear screen 12 and stores such an image. Alternatively, any image, which has externally been inputted, for example, an image, which has been formed by a personal computer, may be stored in a predetermined storing area so that image data can be read out, as an occasion demands. The images as a unit are controlled independently of one another and can be processed to display them independently. An independent control can be made not only on which screen 11 or 12 the image is to be displayed, but also in a position, intensity (i.e., brightness), luminous intensity (i.e., chromaticity), hue, mode and change in image of the display.

In the embodiment of the present invention, the image generation unit 14 is configured so that the screen section-adjustment image can be displayed on each of the front screen 11 and the rear screen 12. The screen section-adjustment images are displayed so as to enable the observer who takes his/her viewing position, to recognize visually these images in a superimposed state on his/her line of sight. The screen section-adjustment images themselves will be described later with reference to FIG. 3.

The first driving unit 15 and the second driving unit 16, which serve as a driver for the display on the respective front and rear screens 11, 12, supplies the image signals, which have been generated by the image generation unit 14, to the respective front and rear screens 11, 12 to display the images thereon. The first and second driving units 15, 16 may have a function of carrying out a decorative and effective display driving with a display timing or flashing.

The control unit 17 controls entirely the display apparatus 1. With respect to the display of three-dimensional image, the control unit 17 sets the display modes of the front and rear screens 11, 12, for example, brightness and intensity of the screen section, and causes the image generation unit 14 to generate the image signals to be displayed on the respective front and rear screens 11, 12. In addition, the control unit 17 controls operation of the first driving unit 15 and the second driving unit 16.

Now, description will be given below of the principle of operation of the display apparatus 1 according to the first example of the present invention.

The screen section-adjustment image is displayed on each of the front and rear screens 11, 12, as shown in FIG. 3. The screen section-adjustment image is displayed so as to enable an observer, who takes his/her position away from the display apparatus 1 in a predetermined direction by a predetermined distance, to recognize visually the screen section-adjustment images in a superimposed state on the line of sight of the observer. The image displayed on the front screen 11 may be identical with, or slightly or quite different from the image displayed on the rear screen 12. In either case, these screen section-adjustment images are viewed in a superimposed state, thus providing three-dimensional image having a predetermined pattern. In view of the positional determination of the front and rear screens 11, 12, these images may be those, which provide a two-dimensional image having the predetermined pattern when viewed in the superimposed state.

As a result, the observer who take his/her position away from the display apparatus 1 in the predetermined direction by the predetermined distance, can recognize visually the screen section-adjustment images displayed on the front and rear screens 11, 12 in the superimposed state on his/her line of sight. Displaying the screen section-adjustment images on the front and rear screens 11, 12 enables the observer to recognize visually the three-dimensional image. More specifically, if the screen section-adjustment images can be viewed in the superimposed state on the observer's line of sight, the display modes of the images displayed on the front and rear screens 11, 12 are considered to be suitable for the three-dimensional display.

As a result, the observer can shift his/her position, while viewing the screen section-adjustment images, thus enabling him/her to confirm his/her viewing position at which the three-dimensional image can be recognize visually.

There is an assumption that an observer views the display apparatus 1 on which the screen section-adjustment images are displayed, as shown in FIG. 4. There is an additional assumption that the observer takes his/her position at a viewing position "A", but cannot recognize visually the three-dimensional image. More specifically, there occurs a deviation between the screen section-adjustment images displayed on the front and rear screens 11, 12 on the above-mentioned assumption. In such a state, even displaying the screen section-adjustment images on the front and rear screens 11, 12 makes it difficult or impossible for the observer to recognize visually these image in the superimposed state on his/her line of sight. In other words, the observer cannot recognize visually any three-dimensional image.

In this case, shifting the observer's position to another viewing position makes it possible to look for an appropriate viewing position at which the three-dimensional image can be recognized visually. Here, there is a further additional assumption that the observer shifts his/her viewing position "A" to another viewing position "B". The observer can recognize visually the screen section-adjustment images displayed on the front and rear screens 11, 12 as the single three-dimensional image. In such a case, displaying images on the front and rear screens 11, 12 enables the observer who takes his/her viewing position "B" to recognize visually these images in a superimposed state on his/her line of sight. In other words, the observer can recognize the three-dimensional image.

In an example case, the front or rear screen 11 or 12 may display information indicative of a proper viewing position at which the screen section-adjustment images currently displayed on the front and rear screens 11, 12 can be recognized visually. This makes it possible for the observer to confirm easily the proper viewing position at which the three-dimensional image can be recognized visually.

According to the first example of the display apparatus of the present invention, displaying the screen section-adjustment images makes it possible for an observer to confirm relatively easily the proper viewing position at which the three-dimensional image can be recognized visually, thus providing great advantageous effects. As a result, the observer can shift his/her position, while viewing the screen section-adjustment images, thus enabling him/her to recognize visually the three-dimensional image in a relatively easy manner.

Then, displaying a plurality of images of which various kinds of three-dimensional image (i.e., three-dimensional image contents) are composed, under the same conditions as the above-described case where the plurality of screen section-adjustment images are displayed in the superimposed state, with the use of the display apparatus 1 of the first example of the present invention makes it possible for the observer who has already made adjustment of his/her viewing position to view or recognize visually the image contents as an appropriate three-dimensional image. Displaying the three-dimensional contents in the display apparatus 1 of the first example of the present invention make it possible for the observer to recognize visually the three-dimensional image, irrespective of the number of the contents.

Second Example of Display Apparatus

Figure 5:
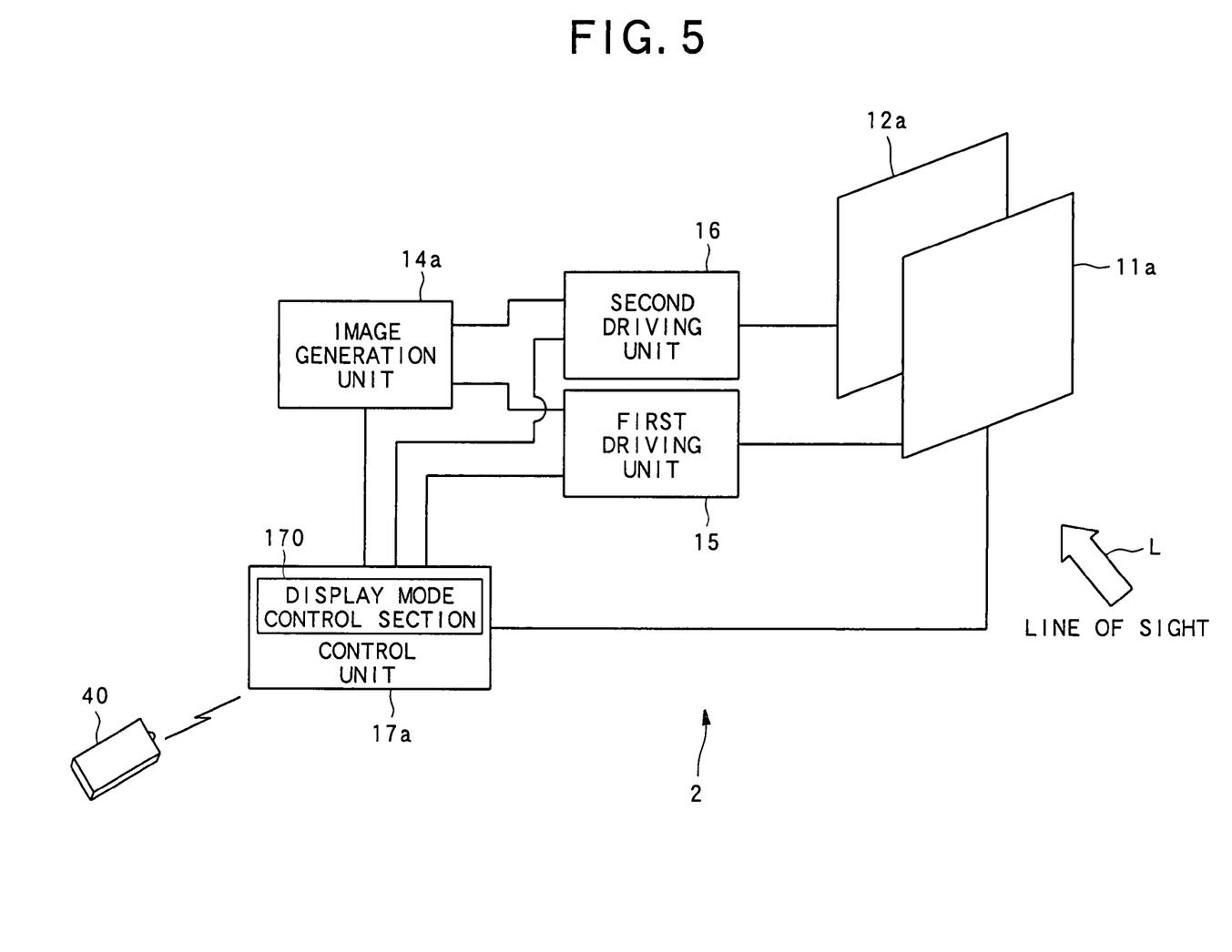
FIG. 5 is a block diagram showing the display apparatus according to the second example of the present invention.
Figure 6:
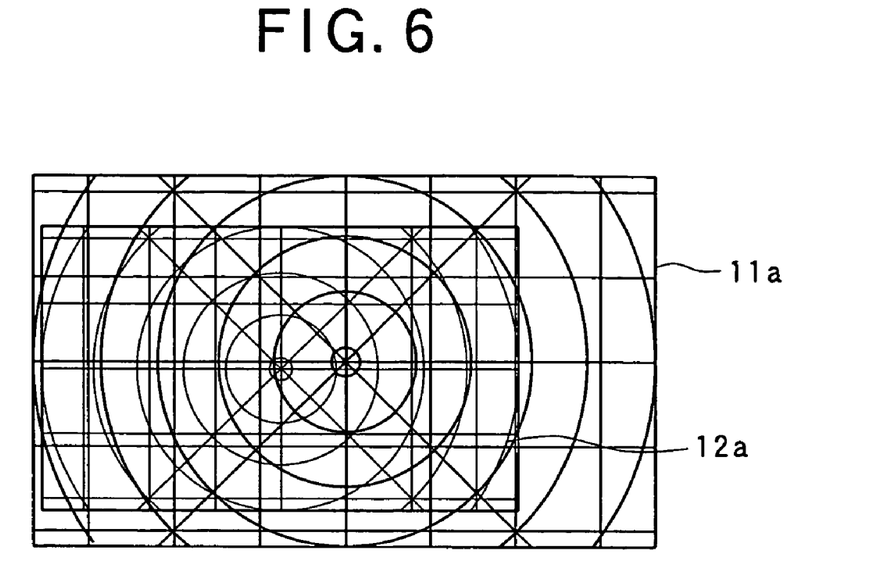
FIG. 6 is a diagrammatic view illustrating conceptually a step for making a change in a display mode for the screen section-adjustment image in accordance with the display apparatus of the second example of the present invention.
Figure 7:
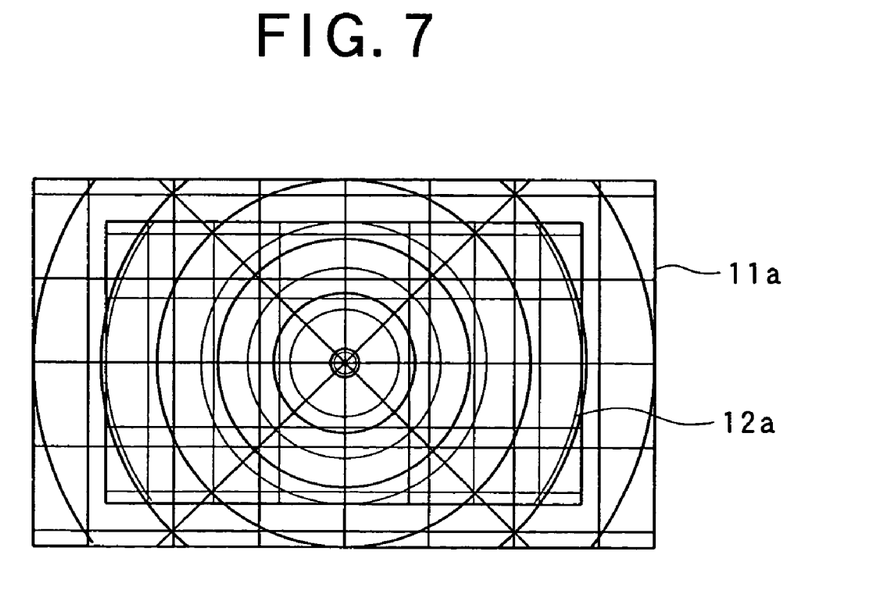
FIG. 7 is a diagrammatic view illustrating conceptually another step for making a change in a display mode for the screen section-adjustment image in accordance with the display apparatus of the second example of the present invention.
Figure 8:
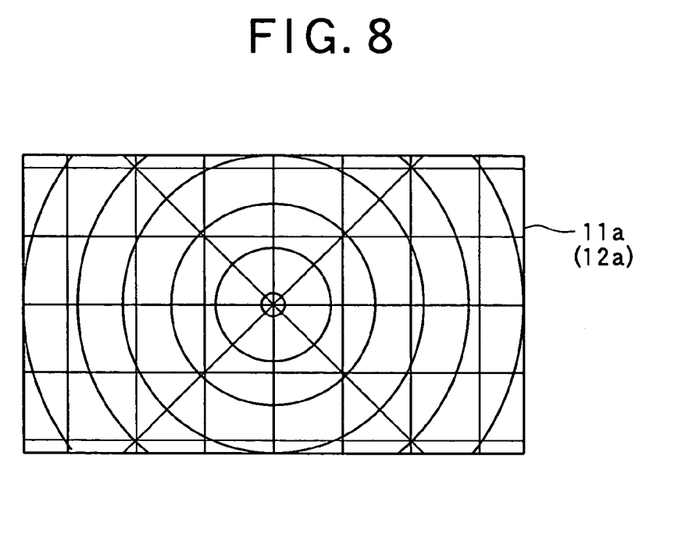
FIG. 8 is a diagrammatic view illustrating conceptually a state in which the display mode for the screen section-adjustment image has been changed in accordance with the display apparatus of the second example of the present invention.
Figure 9:
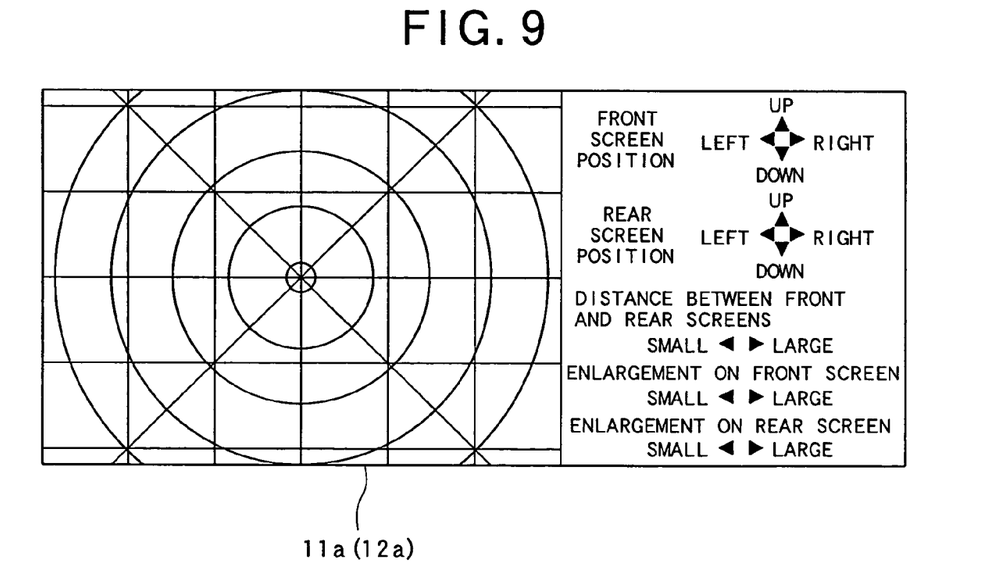
FIG. 9 is a diagrammatic view illustrating conceptually a concrete example of a user's operation screen in the display apparatus according to the second example of the present invention.
Figure 10:
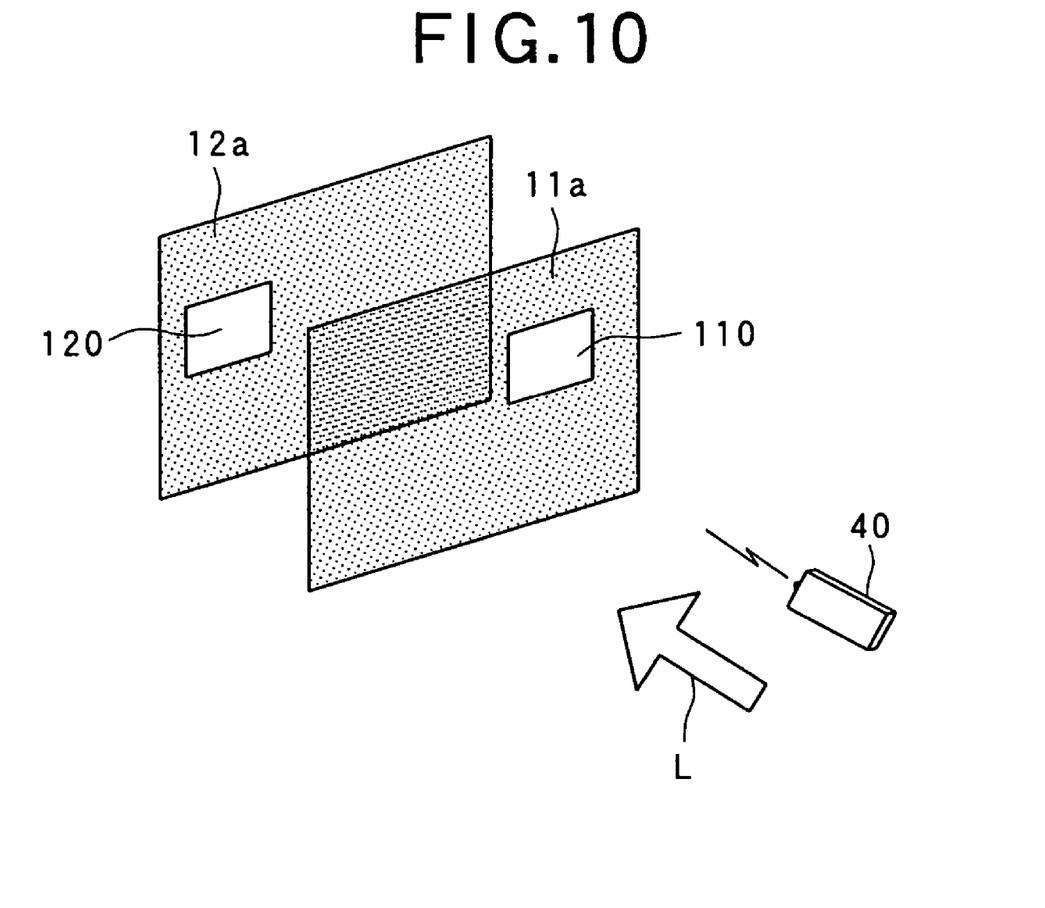
FIG. 10 is a diagrammatic view illustrating conceptually still another step for making a change in a display mode for the screen section-adjustment image in accordance with the display apparatus of the second example of the present invention.

The display apparatus according to the second example of the present invention will be described with reference to FIGS. 5 to 10. In this second example, in case where the position of an observer is changed due to the shift of his/her viewing position, a distance between the shifted position of the observer and the display apparatus is detected to adjust the distance between the image display screens on the basis of the thus detected distance. FIG. 5 is a block diagram showing the display apparatus according to the second example of the present invention; FIG. 6 is a diagrammatic view illustrating conceptually a step for making a change in a display mode for the screen section-adjustment image in accordance with the display apparatus of the second example of the present invention; FIG. 7 is a diagrammatic view illustrating conceptually another step for making a change in a display mode for the screen section-adjustment image in accordance with the display apparatus of the second example of the present invention; FIG. 8 is a diagrammatic view illustrating conceptually a state in which the display mode for the screen section-adjustment image has been changed in accordance with the display apparatus of the second example of the present invention; FIG. 9 is a diagrammatic view illustrating conceptually a concrete example of a user's operation screen in the display apparatus according to the second example of the present invention; and FIG. 10 is a diagrammatic view illustrating conceptually still another step for making a change in a display mode for the screen section-adjustment image in accordance with the display apparatus of the second example of the present invention. The same reference numerals are given to the same structural components as the first example as described of the present invention, and description thereof is therefore omitted.

The display apparatus 2 includes a front screen 11a; a rear screen 12a disposed behind the front screen 11a; an image generation unit 14a for generating images to be displayed on the front screen 11a and the rear screen 12a; the first driving unit 15 for supplying an image signal from the image generation unit 14a to the front screen 11a to display an image thereon; the second driving unit 16 for supplying an image signal from the image generation unit 14a to the second screen 12a to display an image thereon; an external input unit 40 through which observer's instructions are to be given; and a control unit 17a for controlling entirely the display apparatus 2, as shown in FIG. 5.

The front screen 11a and the rear screen 12a, which form an image display component of the display apparatus 1, are placed so as to be apart from each other by a predetermined distance on a line of sight "L" of an observer. The front screen 11a is disposed on the front side and the rear screen 12a is disposed on the rear side. A display device having a light transmission property, such as a liquid crystal display device or an electroluminescent display device is used as the front screen 11a, in order to make it possible for an observer to recognize the image displayed on the rear screen 12a through the front screen 11a. On the other hand, the rear screen 12a may be such a liquid crystal display device or electroluminescent display device, or a CRT (cathode ray tube) display device, a plasma display device or a field electron emission display device, in view of the fact that the rear screen 12a is not required to be light-transmissible. In addition, the front screen 11a and the rear screen 12a are movable forward or backward on the observer's line of sight, and the distance between these sections 11a and 12a can be increase or decreased.

Each of the front screen 11a and the rear screen 12a has a screen section serving as an area on which an image is to be displayed. Displaying the images on the respective screen sections enables the observer to recognize visually a three-dimensional image, although discrete. Alternatively, adjusting brightness of the images causes the three-dimensional image to be displayed so as to enable the observer to recognize visually as if the three-dimensional image is located between the front screen 11a and the rear screen 12a. Accordingly, a brightness modulation type three-dimensional display is also available.

The screen sections of the front and rear screens 11a and 12a occupy at least part of the respective front and rear screens 11a and 12a as regions on which the image for the three-dimensional display is to be displayed. Alternatively, the screen sections of the front and rear screens 11a and 12a may occupy the entirety of the respective front and rear screens 11a and 12a. Each of the front and rear screens 11a and 12a has the single screen section, but may have a plurality of screen sections.

There may be adopted a configuration that a half mirror is used so that the image displayed on the front screen 11a is superimposed on the image displayed on the rear screen 12a by the half mirror on the observer's line of sight, in the same manner as the first example of the present invention as described above.

The front screen 11a and the rear screen 12a are movable along the line of sight "L" or a direction intersecting the line of sight "L". More specifically, there are provided, for example, a motor serving as a power driving source, a belt mechanism or a gear train for converting the driving force generated by the motor into a moving power by which the front and rear screens 11a, 12a can be moved, and the other relevant components. The motor operates to rotate its shaft by a predetermined amount of rotations on the basis of the instructions given by the control unit 17a, so as to transmit the driving force to the belt mechanism or gear train through which the motor and the front and rear screens 11a, 12a are connected. Operation of the belt mechanism or gear train moves the front and rear screens 11a, 12a along the line of sight "L" or a direction intersecting the line of sight "L".

Both of the front and rear screens 11a, 12a are described to be movable. Only any one of the front and rear screens 11a, 12a may be movable.

A variable-focal-length lens, i.e., a liquid crystal lens may optionally be provided between the front and rear screens 11a, 12a. Changing the focal length of the liquid crystal lens makes it possible to change the apparent distance between the observer and the rear screen 12a, which is recognized through the liquid crystal lens by the observer.

The image generation unit 14a generates the image to be displayed on the front screen 11a and the rear screen 12a and stores such an image. Alternatively, any image, which has externally been inputted, for example, an image, which has been formed by a personal computer, may be stored in a predetermined storing area so that image data can be read out, as an occasion demands. The images as a unit are controlled independently of one another and can be processed to display them independently. An independent control can be made not only on which screen 11a or 12a the image is to be displayed, but also in a position, intensity (i.e., brightness), luminous intensity (i.e., chromaticity), hue, mode and change in image of the display, or a position, intensity, luminous intensity, hue, distortion and inclination angle of the screen section serving as the regions on which the images are to be displayed. Such a control is made on the basis of instructions given by the control unit 17a or a display mode control unit 170 described later.

The control unit 17a controls entirely the display apparatus 2. With respect to the display of three-dimensional image, the control unit 17a sets the display modes of the front and rear screens 11a, 12a, for example, brightness and intensity of the screen section, and causes the image generation unit 14a to generate the image signals to be displayed on the respective front and rear screens 11, 12. In addition, the control unit 17a controls operation of the first driving unit 15 and the second driving unit 16.

In the second example of the display apparatus of the present invention, the control unit 17a includes the display mode control unit 170. The display mode control unit 170 controls, for example, the motor to move physically the front and rear screens 11a, 12a. Alternatively, the display mode control unit 170 outputs control signals to the image generation unit 14a to control the image generation unit 14a, in order to change the display modes of the screen sections of each of the front and rear screens 11a, 12a. In case where the liquid crystal lens is provided between the front and rear screens 11a, 12a, the display mode control unit 170 controls voltage applied to the liquid crystal lens to adjust it to the predetermined value. Such a control may be made on the basis of instructions given by the external input unit 40.

The external input unit 40, which includes for example, a remote controller, a fixed controller or a touch screen, enables the instructions to change the display mode of the image displayed on the front or rear screens 11a, 12a, to be given to the control unit 17a. The external input unit 40 has buttons with indication of "arrow" or a dial so that operation of the button or the dial causes operation signals indicative of such "instructions" to be sent to a receiving section or an input interface provided in the control unit 17a by wired or wireless connections.

Now, description will be given below of the principle of operation of the display apparatus 2 according to the second example of the present invention.

The screen section-adjustment image is displayed on each of the front and rear screens 11a, 12a, as shown in FIG. 6. Here, an observer cannot recognize visually the screen section-adjustment images displayed on the respective front and rear screens 11a, 12a in a superimposed state on his/her line of sight. Then, instructions to change the display mode of the image displayed for example on the rear screen 12a is inputted into the control unit 17a through operation of the external input unit 40.

First, there is carried out a center alignment operation of the screen section-adjustment images displayed on the front and rear screens 11a, 12a. In this case, instructions to change the position of the rear screen 12a are for example inputted through the external input unit 40. More specifically, the instructions to move the rear screen 12a rightward relative to the observer's line of sight by a predetermined distance are inputted into the display mode control unit 170. The display mode control unit 170 into which such instructions have been inputted, controls the amount of rotation of the motor included in the rear screen 12a to move the rear screen 12a rightward relative to the observer's line of sight by the predetermined distance.

On the other hand, giving the similar instructions to move the screen section of the rear screen 12a provides the same effects. More specifically, the instructions to move the screen section of the rear screen 12a rightward relative to the observer's line of sight by a predetermined distance are inputted into the display mode control unit 170. The display mode control unit 170 into which such instructions have been inputted, outputs a control signal indicative of movement of the screen section of the rear screen 12a into the image generation unit 14a. The image generation unit 14a rewrites the image signal indicative of the position of the screen section of the rear screen 12a so that the image is displayed on the rear screen 12a on the basis of the rewritten image signal. As a result, the screen section of the rear screen 12a moves rightward relative to the observer's line of sight by the predetermined distance.

Consequently, the observer can recognize visually the screen section-adjustment images displayed on the front and rear screens 11a, 12a in a state where the centers of these images are alight with each other, as shown in FIG. 7.

Here, the screen section-adjustment images displayed on the respective front and rear screens 11a, 12a differs in size from each other, as shown in FIG. 7. Instructions to enlarge the screen section of the rear screen 12a at a predetermined magnification are inputted into the display mode control unit 170 through the external input unit 40, in order to enable the observer to recognize visually the screen section-adjustment images in the same size (i.e., in the superimposed state on the observer's line of sight). The display mode control unit 170 into which such instructions have been inputted, outputs a control signal indicative of enlargement of the screen section of the rear screen 12a into the image generation unit 14a. The image generation unit 14a rewrites the image signal indicative of the size of the screen section of the rear screen 12a so that the image is displayed on the rear screen 12a on the basis of the rewritten image signal. As a result, the screen section of the rear screen 12a is enlarged at the predetermined magnification.

Alternatively, giving instructions to move forward the rear screen 12a on the observer's line of sight provides the similar effects. In such a case, the instructions to change the position of the rear screen 12a are inputted through the external input unit 40. More specifically, the instructions to move the rear screen 12a forward to the observer by a predetermined distance are inputted into the display mode control unit 170. The display mode control unit 170 into which such instructions have been inputted, controls the amount of rotation of the motor included in the rear screen 12a to move the rear screen 12a forward to the observer by the predetermined distance. Moving the rear screen 12a forward to the observer causes him/her to recognize as if the image displayed on the rear screen 12a is enlarged on his/her line of sight. The rear screen 12a is moved forward to the observer by the predetermined distance so as to enable the observer to recognize visually the image displayed on the rear screen 12a in the same size as the image displayed on the front screen 11a. The above-mentioned predetermined distance may be calculated by means of the display mode control unit 170 on the basis the predetermined magnification of the screen section of the rear screen 12a, which has been inputted through the external input unit 40.

As a result, there can be achieved the display apparatus 2, which enables an observer to recognize visually the screen section-adjustment images displayed on the front and rear screens 11a, 12a in a superimposed state on his/her line of sight. Then, displaying a plurality of images of which various kinds of three-dimensional image (i.e., three-dimensional image contents) are composed, under the same conditions as the above-described case where the plurality of screen section-adjustment images are displayed in the superimposed state, with the use of the display apparatus 2 of the first example of the present invention makes it possible for the observer who has already made adjustment of his/her viewing position to view or recognize visually the image contents as an appropriate three-dimensional image. Displaying the three-dimensional contents in the display apparatus 2 of the first example of the present invention make it possible for the observer to recognize visually the three-dimensional image, irrespective of the number of the contents.

In addition, it is also possible to make adjustment in the other parameters than the above, i.e., brightness, chromaticity, distortion and inclination angle of the front or rear screen 11a, 12a. In such a case, the display mode control unit 170 outputs a control signal indicative of change in such a parameter into the image generation unit 14a in the similar manner to the case as described above. The image generation unit 14a rewrites the image signal indicative of the brightness, chromaticity, distortion and inclination angle of the front or rear screen 11a, 12a on the basis of the rewritten image signal. As a result, the images are displayed on the front or rear screen 11a, 12a on the basis of the rewritten image signal.

An operation screen as shown in FIG. 9 may be provided in order to make the above-mentioned screen adjustment.

A screen adjustment menu is displayed on the front and rear screens 11a, 12a together with the screen section-adjustment images, as shown in FIG. 9. An observer may select a suitable button or icon on the screen adjustment menu by instructions given through the external input unit 40, so as to change the display mode of the screen section-adjustment images. Accordingly, a relatively easy operation makes it possible to change the display mode of the screen section-adjustment images, thus achieving the display apparatus, which enables an observer to recognize visually the three-dimensional image in a relatively easy manner.

In addition, adjustment for example in brightness of the screen section may be made utilizing images as shown in FIG. 10, in place of the above-described screen section-adjustment images.

A screen section 110 is displayed on a predetermined area of the front screen 11a, and the other screen section 120 is displayed on a predetermined area of the rear screen 12a. The screen sections 110, 120 are displayed so as not to be superimposed each other on an observer's line of sight, with the result that the observer recognizes visually these sections 110, 120 independently. More specifically, the screen section 110 is located on the right-hand side relative to the observer's line of sight, and the screen section 120 is located on the left-hand side relative thereto.

The screen section-adjustment image is displayed on each of the screen sections 110, 120. In an example case as shown in FIG. 10, the screen sections 110, 120 are solid filled rectangles with white color, so as to provide solid white images. Brightness of these images can be changed through instructions given by the external input unit 40. It is therefore possible to make adjustment in brightness of these images to an extent that an observer recognize visually the images displayed on the screen sections 110, 120 to be identical in brightness. Such a fine adjustment in brightness makes it possible to provide a more improved three-dimensional image, especially when achieving a brightness modulation type three-dimensional display.

In the above-described examples of the present invention, the apparatus includes two screens (i.e., display units), but may have three or more screens, thus providing the same effects. The screen section-adjustment images are not limited only to the images as used in the examples, and any desired images may be used as the screen section-adjustment images. In addition, the present invention is not limited only to the matter that each of the front and rear screens 11, 12 includes the single screen section-adjustment image displayed thereon. Two or more screen section-adjustment images may be displayed on each of the front and rear screens 11, 12 in order to adjust the display mode of each of the front and rear screens 11, 12.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-16241 filed on Jan. 24, 2003 including the specification, claims, drawings and summary is incorporated herein by reference in its entirety.

What is claimed is:

1. An apparatus for displaying a three-dimensional image of an object to be displayed, through a superimposing of a plurality of images of said object, which are placed so as to be apart from each other on a line of sight of an observer, comprising:
    a plurality of display units disposed in tandem on said line of sight, each of said plurality of display units comprising at least one screen section for displaying at least one image of said plurality of images;
    an image generation unit for generating images of contents to be displayed on the display units; and
    a display image control unit for controlling the image generation unit to display the images of contents on the display units so as to enable the observer to recognize the images of contents as three-dimensional images; wherein
    the image generation unit generates, in addition to the images of contents, adjustment images having a geometric pattern; and
    the display image control unit controls the image generation unit to display the adjustment images on the display units so as to provide an appropriate relative viewing position between the observer and the display units, at which position the images of contents are visually recognized as a three-dimensional image.

2. The apparatus as claimed in claim 1, farther comprising:

a display mode control unit for making a change in a display mode for said screen section-adjustment image, which is displayed on at least one display unit of said plurality of display units; and an input unit for enabling instructions on change in said display mode to be inputted into said display mode control unit.

3. The apparatus as claimed in claim 2, wherein:

said input unit comprises an external input device through which an external input operation is to be carried out.

4. The apparatus as claimed in claim 2, wherein:

said display mode control unit is configured to enable said at least one display unit to shift in a predetermined direction; and said input unit enables instructions to shift said at least one display unit in said predetermined direction by a predetermined distance to be inputted into said input unit.

5. The apparatus as claimed in claim 2, wherein:

said display mode control unit comprises a variable-focal-length lens that varies an apparent distance between adjacent two display units of said plurality of display units to vary; and said input unit causes instructions to vary said apparent distance to a predetermined distance to be inputted into said input unit.

6. The apparatus as claimed in claim 2, wherein:

said display mode control unit is configured to enable said at least one screen section to shift on a plane, which intersects said line of sight; and said input unit enables instructions to shift said at least one screen section by a predetermined distance to be inputted into said input unit.

7. The apparatus as claimed in claim 2, wherein:

said display mode control unit scales said at least one screen section; and said input unit enables instructions to scale said at least one screen section at a predetermined magnification to be inputted into said input unit.

8. The apparatus as claimed in claim 2, wherein:

said display mode control unit is configured to enable brightness of at least one part of said at least one screen section to vary; and said input unit enables instructions to vary the brightness of said at least one part to be inputted into said input unit.

9. The apparatus as claimed in claim 2, wherein:

said display mode control unit is configured to enable ebromaticity of at least one part of said at least one screen section to vary; and said input unit enables instructions to vary the chromaticity of said at least one part to be inputted into said input unit.

10. The apparatus as claimed in claim 2, wherein:

said display mode control unit is configured to enable distortion of at least one part of said at least one screen section to vary; and said input unit enables instructions to vary the distortion of said at least one part to be inputted into said input unit.

11. The apparatus as claimed in claim 2, wherein:

said display mode control unit is configured to enable an inclination angle of at least one part of said at least one screen section to vary; and said input unit enables instructions to vary the inclination angle of said at least one part to be inputted into said input unit.

12. The apparatus as claimed in claim 6, wherein:

said display mode control unit applies a signal processing to an image signal supplied to said at least one display unit to make a change in the display mode for said screen section-adjustment image.

13. The apparatus as claimed in claim 2, further comprising:

a record unit for recording state information on a predetermined state of said apparatus.

14. The apparatus as claimed in claim 13, wherein:

said input unit enables any one of said state information to be selected and enables instructions to make a change in the display mode based on said any one as selected to be inputted into said input unit.

15. The apparatus as claimed in claim 1, wherein:

of said plurality of display units, at least one display unit other than a display unit, which is disposed on a rearmost side in a viewing direction of said observer, comprises a translucent display device.

16. The apparatus as claimed in claim 15, wherein:

said translucent display device comprises any one of a liquid crystal display device and an electroluminescent display device.

17. The apparatus as claimed in claim 1, wherein:

said plurality of display units comprise at least one composite display unit, which is obtained thorough composition by means of a half mirror.

18. A method for displaying a three-dimensional image of an object to be displayed, through a superimposing of a plurality of images of said object, which are placed so as to be apart from each other on a line of sight of an observer, said method comprising:

providing a plurality of display units disposed in tandem on said line of sight;

generating images of contents to be displayed on the display units; and controlling display of the images of contents on the display units so as to enable the observer to recognize the images of contents as three-dimensional images; wherein said generating images of contents to be displayed on the display units further cormprises generating adjustment images having a geometric pattern; and said controlling display of the images of contents on the display units so as to enable the observer to recognize the images of contents as three-dimensional images further comprises controlling the image generation unit to display the adjustment images on the display units so as to provide an appropriate relative viewing position between the observer and the display units, at which position the images of contents are visually recognized as a three-dimensional image.

19. The method as claimed in claim 18, further comprising:

a display mode control step for making a change in a display mode for said screen section-adjustment image, which is displayed on at least one display unit of said plurality of display units; and an input step for inputting instructions on change in said display mode.

20. The method as claimed in claim 19, further comprising:

a record step for recording state information on a predetermined state of an apparatus for displaying the three-dimensional image.

* * * * *